Figure 1:
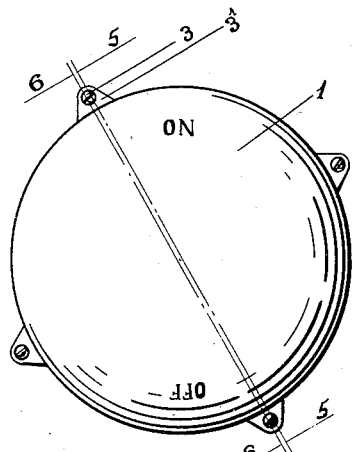

July 25, 1933.   S. S. GREEN   1,920,033
CONTROLLER FOR ELECTRIC CIRCUITS
Filed July 21, 1930    2 Sheets-Sheet 1

Stanley S. Green.   INVENTOR
BY
ATTORNEY

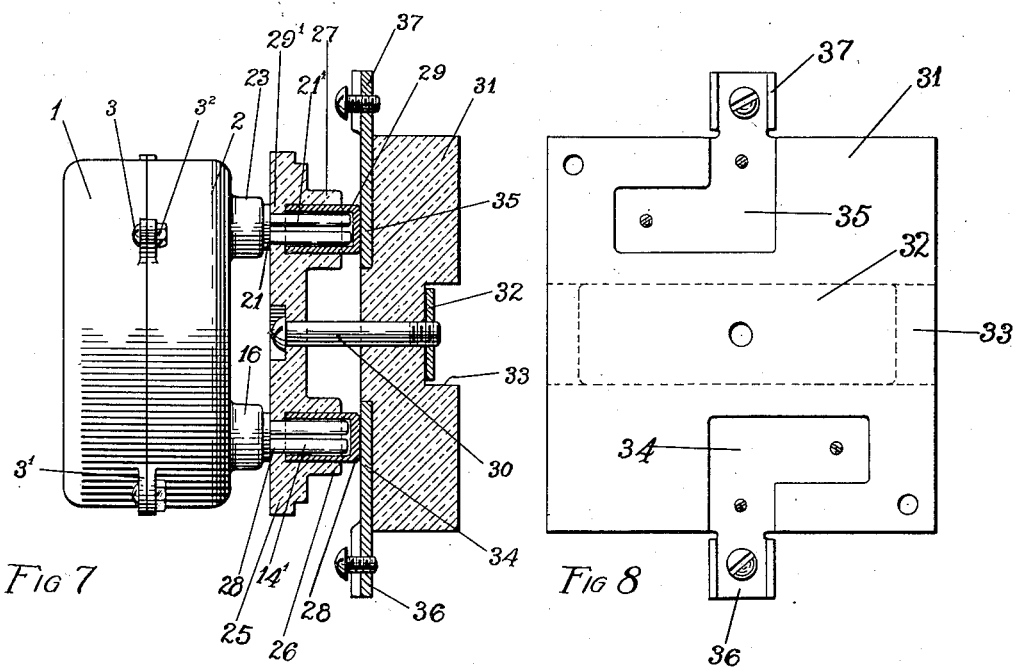
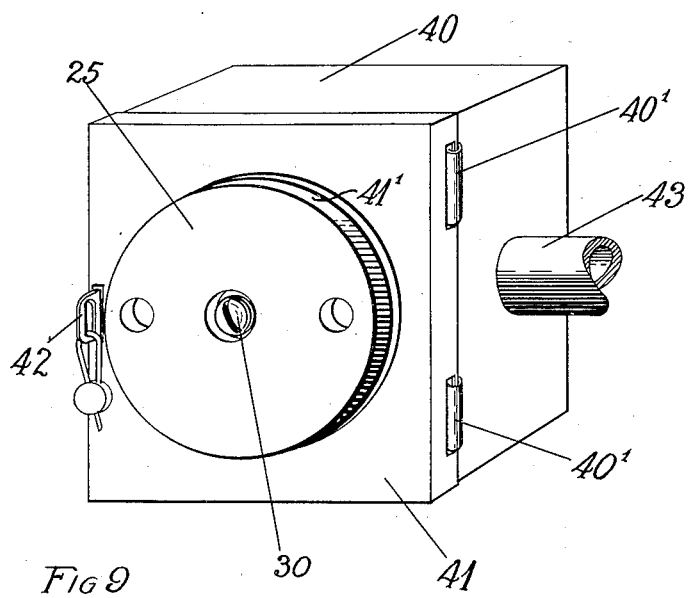

Patented July 25, 1933

1,920,033

UNITED STATES PATENT OFFICE

STANLEY S. GREEN, OF LA FAYETTE, INDIANA, ASSIGNOR TO DUNCAN ELECTRIC MANUFACTURING COMPANY, OF LA FAYETTE, INDIANA, A CORPORATION OF ILLINOIS

CONTROLLER FOR ELECTRIC CIRCUITS

Application filed July 21, 1930. Serial No. 469,333.

My invention relates to controllers for electric circuits and is of particular utility in connection with structures forming the subject matter of my copending application Serial No. 285,114 filed June 13, 1928, though my invention is not to be limited to this use. In my said copending application, I have disclosed an electric circuit controller which is inclusive of a body of electric current conducting material, such as mercury, that is normally contained in the bore or passage of a conduit made of insulating material. This current conducting liquid serves to electrically connect two electrodes of the associated circuit, when the device is in circuit closing position. When there is an abnormal flow of current through the device, the liquid conductor, or a sufficient portion of it, is expelled to break the electrical connection between the electrodes and thereby open the circuit and guard the translating device within the circuit. The liquid conductor and associated electrodes and parts thus constitute a circuit protecting switch.

My present invention has for its general objects the formation of a switch structure which is simple and yet strong enough to withstand the violence which attends its operation, the provision of a great resistance to flash over within the switch to minimize destructive arcing, the supply af a convenient and cheap weak link in addition to the current limiting conductor, the attainment of a construction and relation of parts which will lend themselves to easy and economical quantity production, and the provision of a method of connecting the switch to the circuit by supporting means inclusive of switching contacts to allow the desired movement of the switch between circuit closing or "on" and circuit opening or "off" positions. A further object is to make the circuit controller easily detachable from the supporting means by which it is connected into the controlled circuit and to render the controlled circuit terminals difficult of access by unauthorized persons at all times and even when the circuit controller is thus removed.

I desirably reenforce the conduit of insulating material with a metallic shell and fasten it firmly in spaced interior relation to the container. I preferably make such container with two mating shells or cups of insulating material clamped together with a sealing material therebetween and arranged to be imperforate to the outer air. The reenforcing and supporting shell on the conduit of insulating material desirably has a relative shape and spacing and is so insulated with respect to adjacent conducting parts having electric potential therebetween as to provide a very great flash over resistance of the controlled current around the conduit and through the reenforcing shell or support thereof. The arcing distance between electrodes when the circuit is broken is made ample to prevent any continuation of such arcing through the insulating conduit and all arcing is removed from the walls of the container a sufficient distance to prevent injury of such walls by the arcing. One of the electrodes is also preferably extended to provide an arc shield for the container. The emergency weak link or fuse is desirably within the circuit controller. It is calibrated to open the circuit at any predetermined desired value of current above the value at which the liquid conductor between electrodes is normally depended upon to break the circuit in order to provide a still greater element of safety should the liquid conductor interruption action for any reason fail to occur. This emergency weak link may also be one of the electrodes suitably shaped for the purpose. A carrier rotatably mounted upon a stationary base to which the controlled circuit terminals fasten is provided having switching contacts operable upon motion of the carrier to connect with the terminals of the controlled circuit and means is provided for readily attaching or detaching the circuit controller to provide connection by way of the carrier terminals through the circuit controller for the controlled circuit current when the assembly of circuit controller and carrier is moved through the proper motion cycle. Provision is also made for enclosing the carrier and its stationary base in a protective housing with the face of the carrier exposed for application or removal of the circuit controller and such carrier face is made to be free of exposed electrically charged terminals when the circuit controller is removed from the same.

Figure 2:
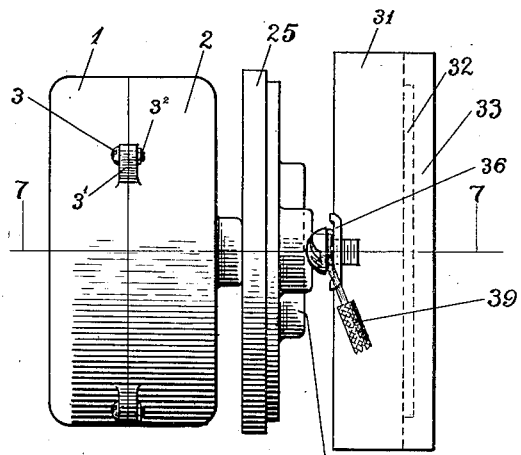
Figure 3:
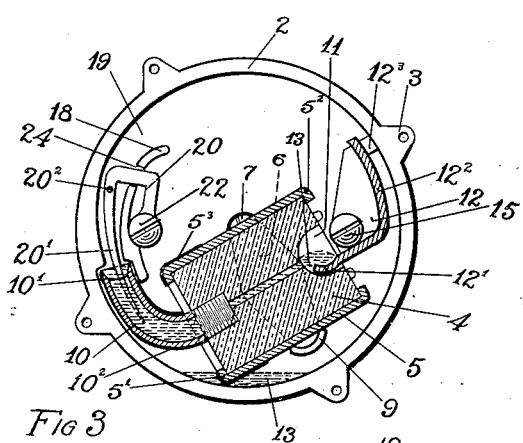
Figure 4:
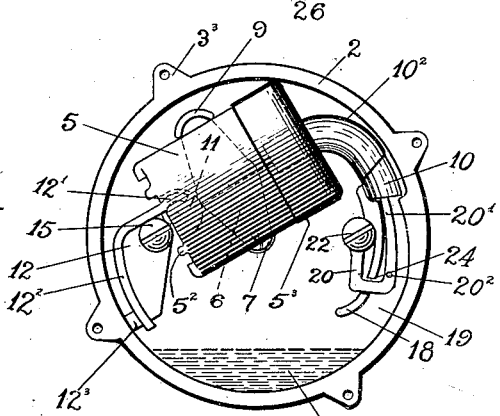
Figure 5:
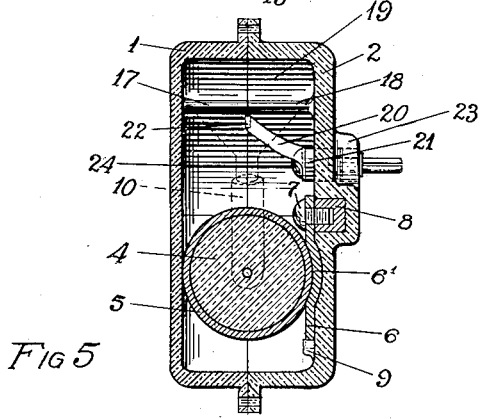
Figure 6:
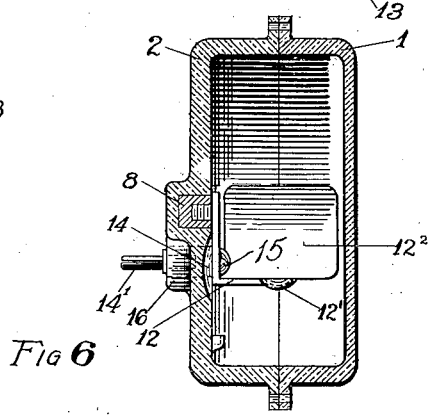

The invention has other characteristics that will be more fully explained in connection with the accompanying drawings in which Fig. 1 is a front elevation of the circuit controller alone, in the normally "on" or circuit closing position; Fig. 2 is a side elevation of the circuit controller applied to its carrier and base in the "on" position; Fig. 3 is a front elevation, partially in section, of the circuit controller only, the removable front section of the enclosing casing being omitted, the circuit controller being in the "on" position; Fig. 4 is a view, somewhat similar to Fig. 3, but showing the controller in its "off" or circuit opening position and illustrating parts in elevation that appear in section in Fig. 3; Fig. 5 is a section on the line 5—5 of Fig. 1 of the circuit controller only; Fig. 6 is a section on the line 6—6 of Fig. 1; Fig. 7 is a section through the carrier and its base on line 7—7 in Fig. 2, but showing the circuit controller in elevation and in position on the receptacle, the entire assembly being in the "on" position; Fig. 8 is a plan view of the carrier base with the carrier removed; and Fig. 9 is a perspective view of the carrier whose base is mounted in a protective box or housing.

In the form of the invention illustrated, the casing is formed of insulating material, such as moulded bakelite or similar material having a phenolic resin base, excepting for the bolts, screws, and the anchorages that are united therewith. The casing is inclusive of the front half or removable cup-shaped section or shell 1 and the rear half or removable cup-shaped section or shell 2. These casing sections are clamped snugly together as by means of the metallic bolts 3 which pass through external ears 3' formed on the casing section, and into the nuts 3². The pressure exerted by said bolts is sufficient to bring the engaging flat faces of the casing sections into intimate contact so that the casing is imperforate in this region and throughout the entire circumference of the casing which is desirably cylindrical. A film of cement such as bakelite varnish, is desirably applied to these flat surfaces before placing them together and tightening bolts 3. The circuit controlling element is within the casing and is operable to "on" and "off" positions by suitably moving the casing. This circuit controlling element includes as shown in the embodiment of the invention illustrated, a tube or conduit 4 of refractory heat resisting insulating material, preferably porcelain produced by the wet process. This tube or conduit is surrounded by a reenforcing metal shell or jacket 5 that is preferably of iron and is initially of smaller internal diameter or size than the portion of the conduit it surrounds and requires expansion by heat in order that it may be tightly secured in place about conduit 4, the jacket being allowed to cool and contract tightly upon the conduit to provide the reenforcement desired. Jacket 5 is preferably formed from sheet metal on a punch press as by drawing. On its end which is normally lower when the jacket 5 and conduit 4 are in the "on" position is provided a flange 5' directly inwardly and along the end of conduit 4. Similarly on the opposite or normally upper end of jacket 5 are provided a series of fingers 5², which, after the conduit 4 is finally positioned in jacket 5 and bottomed against lower flange 5', are bent inwardly over and along the end of conduit 4. Once having been positioned within the jacket 5 and the fingers 5² bent or crimped into place, conduit 4 is permanently and securely metal clad around its periphery, not only throughout its length but even for a substantial distance on each of its ends because of the flange 5' and the fingers 5².

A bracket 6 is made from a piece of sheet metal and curved at a portion 6' to conform to the curvature of jacket 5 at which region the bracket may be spot welded upon the outside of the jacket. Said bracket is securely fastened to and with the casing by a screw 7 passing through a hole in one end of the bracket and threading into an insert 8 moulded within the interior of casing half 2. Insert 8 desirably does not extend all the way through the casing wall, being preferably only accessible within the casing half 2. The other end of bracket 6 is snugly received in the cavity of a curved boss 9 provided on the interior of casing half 2. Said bracket is thus held immovably in position and is prevented from turning about screw 7 as an axis.

The bore of conduit 4 communicates with the bore of a curved metallic feed tube 10 that is preferably made of iron and which snugly threads into an enlargement of the lower end of the conduit bore. Other assembling means may, however, be employed for said tube and conduit. Thus feed tube 10 and conduit 4 become each an extension of the other and the bore of each becomes a continuation of the bore of the other.

The upper end of the bore of the conduit 4 is enlarged to form a well 11 adapted to receive the spoon-shaped end 12' of a metallic electrode 12 which conforms to the well 11 and contacts with the mercury 13 or other liquid conductor contained in the conduit bore and the well enlargement 11 when the device is in circuit closing position. This electrode is preferably not in supporting relation to the conduit. Slight clearance desirably intervenes between the wall of well 11 and the electrode part 12'. Said electrode is fastened in position upon a metallic lead in stud 14 by a screw 15 threading into the inner end of this stud. A boss 16 constituting a part of casing section 2 is securely moulded about the knurled end of stud 14 which passes through to the exterior of the casing and terminates in a split connector portion 14' which acts to connect it to a terminal of the circuit to be controlled. The curved end 12' of the metallic electrode 12 has sufficiently full contact with the liquid conductor in the well 11 without substantially obstructing the free passage of the liquid conductor and gas rapidly escaping from the conduit bore upon severe short circuit. A portion of the electrode 12 is formed to constitute a barrier 12² to protect the casing wall from the explosive effects of the hot mercury or liquid conductor and the vapor thereof that are ejected violently from the conduit bore upon short circuit. This liquid conductor vapor and the attendant arc of high temperature might otherwise strike the casing wall forcibly with injurious effect. Said shield or barrier 12² also absorbs much of the heat contained in the liquid conductor and vapor striking it since being a metal it has a relatively large heat absorbing capacity that acts to condense the liquid conductor vapor and has a marked effect in quenching any arc which might arise between the electrode 12 and other parts of opposite electrical polarity in the casing. A small extension 12³ on electrode 12 is shaped to touch the casing and thus position it and prevent the entire electrode 12 from tending to turn about screw 15 upon explosive impact of mercury vapor against it arising on short circuit. Arc barrier 12² is preferably made of resilient metal so shaped and so cooperating with extension 12³ that there is a small clearance between it and the wall of the casing which it is to protect. Arc barrier 12² is desirably also bent from the sheet metal blank forming the entire electrode structure 12 in such wise that its elasticity will allow it to be bent against the wall of the casing which it protects upon explosive impact to spring back to its original position again upon the removal of pressure against it. With this construction, the elasticity of the metal in barrier 12² is utilized to absorb shock and give additional protection against the same to the casing. Electrode 12 is preferably made of copper or other metal of high electrical and thermal conductivity but plated with a mercury resisting substance such as iron or nickel. The other metals exposed in the container to the action of mercury or mercury vapor may also be made out of non-ferrous metal such as copper, if that metal is coated with iron or other mercury resistant metal.

Mating projections 17 and 18 are respectively integrally moulded with the casing sections 1 and 2, and form with contiguous portions of the casing a funnel-shaped space 19. The receiving end of the feed tube 10 farthest from conduit 4 may be freely received within the stem of the funnel to virtually constitute a continuation thereof. A considerable degree of clearance between the stem of feed tube 10 and the lower end or stem of funnel 19 is, however, desirable in order to provide a tolerance which in manufacture will insure both halves of the casing going together without being prevented by the end of feed tube 10 in the stem of the funnel 19. I have found a clearance on all sides of the feed tube of approximately .010" satisfactory for this purpose giving a diameter of funnel stem approximately .020 greater than the diameter of feed tube 10. In order to permit this clearance and still avoid appreciable leakage from the stem of the funnel around the outside of feed tube 10, an enlargement or bevel 10' around the end of the bore of tube 10 may be provided to provide an easier path for the liquid conductor at this point.

Conduit 4, jacket 5, and feed tube 10 are one integral assembly or unitary switch element supported, as such, on the wall of casing half 1, by the bracket 6. Support is preferably provided for this unitary switch element in no other manner, clearance being afforded as before mentioned at the well 11 of conduit 4 from the large electrode tip 12' and at the stem of the funnel space 19 from feed tube 10. Mechanical shocks upon heavy short-circuit, originating in the conduit 4 can be communicated directly through solid material only by way of its support bracket 6 to insert 8 which is firmly embedded in a strong part of the casing. The conduit 4 is prevented from bursting upon such heavy short circuits by the external supporting jacket 5. The support afforded by jacket 5 is not only radial with respect to conduit 4, but is desirably also axial respecting said conduit due to the flange 5' and the fingers 5² that engage the end faces of the conduit. In addition to this exterior reenforcement against bursting, feed tube 10 because of its unitary character with conduit 4 and its insertion within the bore of this conduit, provides an interior reenforcement against such bursting at the lower end of the conduit bore.

Another electrode 20 is provided to dip into the liquid conductor in the feed tube and thus make connection through the liquid conductor in the feed tube with the liquid conductor at the lower end of the conduit bore. This electrode may be a wire but is more conveniently punched from sheet metal and is supported upon another lead in stud 21 by means of a screw 22 threading into the interior end of the stud. Lead in stud 21 is knurled and is cast into the casing half 2 in the same manner as its companion lead in stud 14 and has around it a boss 23. It passes through the casing and terminates in a split connector portion 21' on the outside of said casing. Electrode 20 passes from lead in stud 21 through a small slot 24 in the interior portion of the wall of the funnel space 19 and has a tip 20' which dips a substantial distance into and below the level of the liquid conductor in feed tube 10 when the liquid conductor is at a normal level in such tube in the normal "on" position of the device as shown in Fig. 3. The bore of feed tube 10 is made large enough to admit such electrode tip 20' with clearance all around it to allow for free passage of the mercury into and out of the tube.

Conduit 4 and feed tube 10 are so positioned with respect to the casing that when the device is turned from "on" to "off" positions, the mercury will be discharged from the bores of conduit 4 and feed tube 10 as well as the well 11, into the surrounding space and to an extent to open the circuit at 12', the liquid conductor then falling to the then bottom of the casing as indicated at 13 in Fig. 4. When the device is turned from "off" to "on" position, the cup of funnel 19 will gather most of the liquid conductor at 13, this gathered liquid passing by gravity through the cup and stem of the funnel into the feed tube 10, and thence to the bore of conduit 4 and well continuation 11 of the conduit bore, whereby the circuit is either closed or reclosed if before interrupted at the electrode 12' as in Figs. 1, 2, 3 and 4 and without the renewal of any parts. To insure closure of the circuit, I provide an excess of mercury or liquid conductor which finds lodgment in the then bottom of the casing as indicated at 13 in Fig. 3, this excess flowing from the well when the device has been fully brought to its "on" or circuit closing position. I have shown no means of limiting the movement of the casing and the enclosed switch to a range between the "on" and "off" positions as such may obviously be employed and located as desired. When the device is in the "on" position and the control circuit is closed at a lamp or other translating device, the circuit is inclusive of lead in stud 21, electrode 20, and electrode tip 20', the mercury in the bore of feed tube 10, the mercury in the bore of conduit 4 and well enlargement 11, electrode tip 12', electrode 12 and thence to lead in stud 14.

Electrode 20 contacts with the mercury contained in feed tube 10 and consequently with the metal of such feed tube via the mercury in it. A possible alternate or arcing path for the controlled current outside of the bore of conduit 4 would, therefore, be from the outside metal surface of feed tube 10 through space to flange 5' thence through the metal of jacket 5 to fingers $5^2$ and through space to some portion of electrode 12. Current flow along this path at any time with consequent arcing between fingers $5^2$ and electrode 12 and flange 5' and metal feed tube 10 would be highly undesirable. I guard against this by making the diameter of insulating conduit 4 large with respect to the diameter of its bore so that the spaces between fingers $5^2$ and any part of electrode 12 and between flange 5' and any part of feed tube 10 is quite appreciable. Such two spaces are in series electrically with relation to the undesired arc and in this way it is possible to make their combining resistance equal to, or even exceed the resistance to arcing within the bore itself of insulating conduit 4.

In addition to such spacing I apply a coating of insulating material $10^2$ to a substantial portion of the outside of feed tube 10 to insulate its exterior so that arcing cannot enter or leave its surface without penetrating and puncturing such insulating coating. As a further precaution a similar insulating coating $5^3$ can be applied to all or a portion of the exterior of jacket 5 but preferably at the end adjacent feed tube 10 because this end is least subject to the hot liquid conductor vapor which is blown out of the bore of conduit 4 and well 11 upon current interruption. As feed tube 10 and jacket 5 at times operate at temperatures well above 100 degrees C., these insulating coatings are preferably highly heat resistant. I have found a number of substances suitable, among them being a form of liquid porcelain cement as well as certain insulating lacquers one of these having an alkide resin base formed with phthalic anhydride and glycerine and known by the trade name "Glyptal", Electrode 20 may be made smaller than electrode 12 and by such construction a weak link or emergency fuse is formed within the circuit controller as is described and broadly claimed in my copending application No. 317,221 filed November 2, 1928. For this purpose a calibrating aperture $20^2$ may be provided on the electrode 20 or else such electrode 20 together with its tip 20' may be otherwise dimensioned and shaped so that it will not carry current above a predetermined maximum value without fusing and opening the circuit. This predetermined value may be made slightly in excess of the predetermined or rated value normally to be carried by the mercury column in the bore of conduit 4. With normal operation, upon excess current in the controlled circuit, the liquid conductor in the bore of conduit 4 ruptures to break the circuit leaving electrode 20 intact, but upon enlargement of the bore of conduit 4 through wear or because of arcing within the circuit controller with consequent abnormal and unsafe increase in current carrying capacity, the electrode 20 is fused, thus providing an additional and absolute element of safety.

A carrier 25 is provided for the circuit controller to secure its connection with the circuit to be controlled and allow its rotation between "on" and "off" positions. Carrier 25 is preferably moulded of a suitable insulating material and is disc-shaped. Bosses 26 and 27 are raised at diametrically opposite points. Thimbles 28 and 29 fit loosely into cylindrical recesses in such bosses. Carrier 25 is mounted upon a bolt 30 or other suitable means which forms a bearing upon which it can be rotated. A base 31 of suitable insulating material is apertured to receive bolt 30 which fastens as by threads to a rectangularly shaped strip of metal 32. This strip is held in an appropriately shaped groove 33 in the back of said base. Strip 32 is given a permanent set before it is placed in the groove so that it is bow-shaped with its concave side toward the base. Bolt 31 pulls strip 32 flat against the bottom of groove 33. Carrier 25 is thus held on bearing bolt 30 and at the same time drawn against the face of the base block 31 by reason of the spring action of said strip.

Two circuit terminal plates 34 and 35 are mounted in grooves on the face of base block 31. These plates have portions 36 and 37 that are furnished with binding screws to which the controlled circuit wires 39 are fastened. Said plates preferably have flat surfaces which may be flush with the surface of base 31. The ends of thimbles 28 and 29 are held against the surface of base 31 and in the rotation of carrier 25 make contact with the respective flat plates 34' and 35' at such times as they sweep over them in their arc of motion.

The end surfaces of thimbles 28 and 29 together with flat contact surfaces 34 and 35 thus constitute an effective switching unit. In their path of rotation when thimbles 28 and 29 leave the surfaces 34 and 35 the circuit controlled is disconnected independently of any disconnection that may be made within the liquid conductor switch itself. By dimensioning contact surfaces 34 and 35 so that they take up a relatively greater or less portion of the arc shaped path of travel of the thimbles 28 and 29 it is possible to make the switching action produced occur either before or after the switching action within the liquid conductor switch as is preferred. If made to occur after, all actual controlled current switching occurs within the liquid conductor switch and consequent sparking or arcing outside of the casing 1, 2 is eliminated and the device is safe for use in places subject to inflammable vapor or gas. If made to occur before, actual switching of the controlled circuit can be done outside of the casing 1, 2,—thus taking the switching wear off of the liquid conductor circuit controller and leaving to it only the work of automatically opening the controlled circuit upon overload. To retain split connector studs 14' and 21' in the thimbles, such studs have their respective halves sprung apart slightly so that when forced into the thimbles good electrical contact is made. The circuit controller may thus be readily plugged into or removed from the carrier and when so removed the carrier nevertheless has a so-called "dead front", no bare charged electrical parts being exposed on the face of the carrier.

It is evident that carrier 25 could be entirely eliminated and the circuit controller 1, 2, itself, fastened to the bearing bolt 30, could be pivoted upon base 31 to obtain switching contact at the surfaces 34 and 35 if desired. Introduction of such carrier 25 merely provides the advantages already enumerated such as ease of attaching or exchanging liquid conductor switches and the like.

It is evident that the complete assembly of base, carrier and circuit controller constitutes a complete circuit breaker device capable of switching the controlled circuit on and off and in addition having a predetermined current carrying capacity beyond which the circuit is opened, but may be re-closed manually without the renewal of any of its parts. Such a circuit breaker device can be used in many ways and if desired can be mounted in the ordinary type of metal switch box so that all wires to and from it can be completely enclosed and metal clad. A particular adaptation of the present form of mounting would be in connection with such forms of metal clad switch housings as are described in my co-pending application No. 463,174 filed June 23, 1930, wherein a liquid conductor circuit controller somewhat similar to the present described controller but with a different form of mounting is described in use with a metal box or cabinet to form a meter entrance switch. As an example of how the present switch and method of mounting can be applied to applications where a box or cabinet is employed Fig. 9 is a perspective view of an enclosing box or housing 40 having a cover 41. Within this box is mounted the carrier and its base. A hole 41' is cut in the cover of the box through which the face of the carrier may extend and be accessible to fill up such hole. In Fig. 9 for clarity the circuit controller is removed showing clearly the flat "dead front" face of the carrier. With such metal box enclosing all bare electrical parts and with such a carrier face it is evident that accidental electrical contact by the operator with charged electrical parts cannot be made with the circuit controller removed. The cover of the box 40 may be hinged as at 40' and be provided with a seal assembly 42 by which unauthorized persons may be kept from undetectably having access to the box. A conduit 43 is shown fastened to one side of box 40 through which one or more wires for connection to the circuit controller may pass.

The circuit breaker device assembled with an enclosing cabinet as in Fig. 9 renders the circuit breaker manually operable by using the body of the casing 1, 2, as a handle from the exterior of the cabinet without the necessity of tampering with anything within the cabinet or even of opening the cover. An additional unique feature is provided in that an entire portion of such circuit breaker assembly which may be that portion which is most subject to damage or which it is most frequently desired to change or renew, may be removed bodily from the cabinet assembly. It is evident that this advantage is existant and obtainable whatever the nature and design of the circuit breaker device used in assembly with the cabinet, whether it be a liquid conductor type or some other type. Although I have illustrated a liquid conductor circuit breaker or switch assembly as specifically applied to and preferable for such accessible and removable application with an enclosing cabinet the invention is not to be so limited.

Changes may be made without departing from the invention.

Having thus described my invention, I claim:

1. An electric device including a container; electrodes therein; a liquid conducting material in the container contacting with said electrodes to close and permit the opening of a circuit between said electrodes through the container; and means supported in fixed position within and with respect to the container and free of support from the electrodes for insuring the opening and closing of the circuit in the container at a point remote from the walls of said container, said container being sufficiently large to form an expansion chamber which will safely accommodate the vaporized liquid conductor.

2. The structure of claim 1 wherein a metallic member anchored firmly to one wall of the container comprises the support for the means for insuring the making and breaking of the contact.

3. An electric device including a container; electrodes therein; a liquid conductor in the container contacting with said electrodes to close and permit the opening of a circuit between said electrodes through the container; and a conduit for the liquid conductor supported in fixed position within and with respect to the container and free of support from the electrodes, said container being sufficiently large to form an expansion chamber which will safely accommodate the vaporized liquid conductor.

4. A liquid conductor circuit controller element including a conduit of heat-resisting insulation and a metallic shell for supporting and strengthening such conduit, said shell having portions extending into engagement with end faces of the conduit whereby axial as well as radial support is contributed by said shell to the conduit.

5. A liquid conductor circuit controller having an expansion chamber and including a conduit of heat resisting insulation having a bore and a bent metallic feed tube whose bore communicates with the conduit bore and with said chamber, said feed tube being in communication with and supported by said conduit.

6. A liquid conductor circuit controller having an expansion chamber and including a conduit of heat resisting insulation having a bore and a metallic feed tube whose bore communicates with the conduit bore and with said chamber, said feed tube being in communication with and supported by said conduit, wherein a shielding coating of insulation is applied to a portion of the tube.

7. A liquid conductor current limiting circuit controller, a shaft on which said circuit controller is annularly movable to circuit opening and closing positions, a base member on which said shaft is supported, stationary contact members on said base member having flat parallel disposed contact faces, contact members on said circuit controller arranged to contact said stationary contact members, and a spring urging said controller and said base member toward each other in such manner that the contacts are held in close contact.

8. A liquid conductor circuit controller; a pivoted carrier for said circuit controller; a stationary base for said carrier; contact members on said carrier; stationary contact members on said base engageable with the contact members on the carrier when the circuit controller is in circuit closing position; and means on said carrier whereby said liquid conductor circuit controller may be detachably fastened to said carrier.

9. The structure of claim 8 wherein the carrier is provided with a front surface of insulating material devoid of charged electrical parts.

10. The structure of claim 8 wherein a cabinet is provided for the carrier and base having an aperture in its front through which the carrier extends to substantially close said aperture.

11. A liquid conductor circuit controller including a container; a liquid conductor in the container; electrodes extending into said conductor; heat resisting insulation within the container for causing the make and break of the controlled circuit to occur at a point remote from the walls of the container; and a metallic support for said heat resisting insulation and a coating of insulating material on a portion of said metallic support.

12. A liquid conductor circuit controller including a container; a liquid conductor in the container; electrodes extending into said conductor; heat resisting insulation within the container for causing the make and break of the controlled circuit to occur at a point remote from the walls of the container; and a metallic member fastened to said heat resisting insulation, said metallic member having an insulating shield over a portion of its surface.

13. An electric circuit controlling appliance of predetermined current carrying capacity including an enclosing cabinet having a cover; a stationary base within said cabinet; terminals on the base for connection with the circuit to be controlled; and a circuit breaker device supported by said stationary base and automatically operable upon overload to interrupt the controlled circuit and manually operable to reclose such circuit, there being an aperture in one face of said cabinet having a portion of such circuit breaker assembly extending therethrough and from which the circuit breaker unit is bodily removable for renewal or change without opening said enclosing cabinet.

14. An electric current controller including a conduit; a liquid conductor in said conduit; and electrodes that are connected by the liquid conductor, one of these electrodes being formed to constitute an emergency fusible link calibrated to interrupt the controlled circuit only at a current value above that required to produce normal automatic interruption of the controlled circuit at the liquid conductor.

15. The structure of claim 13 wherein the circuit breaker device is inclusive of a liquid conductor switch and a pivoted rotatable carrier, said carrier having a front of insulating material.

16. The structure of claim 13 wherein the circuit breaker device is inclusive of a liquid conductor switch and a pivoted rotatable carrier, said liquid conductor switch and said carrier being fastened together by complimentary connector pieces comprising the lead in and lead out terminals of said liquid conductor switch.

17. A liquid conductor current limiting circuit controller, a base upon which said controller is pivotally mounted about a given axis, base contact members having faces disposed substantially perpendicular to the pivotal axis, controller contact members arranged to contact said base contact members through a part of the pivotal movement of said controller, and means for retaining said contact members in tight contact during said part of the pivotal movement.

18. A liquid conductor circuit controller; a pivoted carrier for said circuit controller; a stationary base for said carrier; contact members on said carrier; stationary contact members on said base engageable with the contact members on the carrier when the circuit controller is in circuit closing position; and a pair of means on said carrier whereby said controller may be electrically connected and detachably fastened to said carrier.

19. A liquid conductor current limiting circuit controller including a spacious container, a liquid conductor in the container, electrodes within said container contacting said liquid conductor, a control conduit of heat resisting insulation containing the liquid conductor connecting said electrodes, said conduit opening into said container at at least one end, and a metallic support for said control conduit, and a coating of insulating material on at least a portion of said metallic support.

20. The combination of a liquid conductor circuit controller, a mounting for said controller which enables said controller to be rotated for the operation of the same, and a protecting cabinet for the connections to said controller; said cabinet having an opening through one side thereof through which said controller projects, said opening being closed by the said controller and its mounting.

21. An electric circuit controlling appliance of predetermined current carrying capacity including an enclosing cabinet having a circular opening in one face; a stationary base within said cabinet; terminals on the base for connection with the circuit to be controlled; a circular member mounted on said base to rotate within and close said opening, and having electrical connections with said base; and circuit control means rigidly attached to and electrically connected with said circular member.

STANLEY S. GREEN.